US008520583B2

(12) United States Patent
Kasslin et al.

(10) Patent No.: US 8,520,583 B2
(45) Date of Patent: Aug. 27, 2013

(54) METHOD, APPARATUS, AND COMPUTER PROGRAM PRODUCT FOR ROAMING PARTNER DISCOVERY

(75) Inventors: Mika Ilkka Tapani Kasslin, Espoo (FI); Gabor Bajko, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 199 days.

(21) Appl. No.: 13/099,539

(22) Filed: May 3, 2011

(65) Prior Publication Data

US 2012/0281609 A1 Nov. 8, 2012

(51) Int. Cl.
*H04B 7/00* (2006.01)

(52) U.S. Cl.
USPC .......................... 370/312; 370/338; 370/432

(58) Field of Classification Search
USPC ....... 370/328–338; 455/432.1–433, 436–444
See application file for complete search history.

(56) References Cited

U.S. PATENT DOCUMENTS

| | | | |
|---|---|---|---|
| 2006/0221919 A1* | 10/2006 | McRae et al. | 370/338 |
| 2007/0141988 A1 | 6/2007 | Kuehnel et al. | |
| 2008/0316982 A1 | 12/2008 | Murty et al. | |
| 2009/0010399 A1 | 1/2009 | Kim et al. | |
| 2009/0245133 A1 | 10/2009 | Gupta et al. | |
| 2010/0008285 A1* | 1/2010 | Kuroda | 370/315 |
| 2010/0275249 A1 | 10/2010 | McCann et al. | |
| 2010/0313020 A1* | 12/2010 | Montemurro | 713/168 |

FOREIGN PATENT DOCUMENTS

WO 2008/147130 A2 12/2008

OTHER PUBLICATIONS

Minghui Shi, et al. "IEEE802.11 Roaming and Authentication in Wireless LAN/Cellular Mobile Networks", IEEE Wireless Communications • Aug. 2004, pp. 66-75.
Elias C. Efstathiou, et al.,."A Peer-to-Peer Approach to Wireless LAN Roaming" In Proceedings of the First ACM International Workshop on Wireless Mobile Applications and Services on WLAN Hotspots, pp. 10-18, San Diego, CA, 2003.
M. Buddhikot, et al., "Integration of 802.11 and Third-Generation Wireless Data Networks", IEEE INFOCOM 2003, 10pp.
Wi-Fi Alliance Technical Committee P2P Task Group Wi-Fi Peer-to-Peer (P2P) Technical Specification Version 1.1, 2010.
IEEE 802.11u-2011, Wireless LAN Medium Access Control (MAC) and Physical Layer (PHY) Specifications, Amendment 9: Interworking with External Networks, Feb. 25, 2011.
International Search Report and Written Opinion mailed Jun. 12, 2012 in international application serial No. PCT/FI2012/050260, 15pp.
Yen, L. et al., "Experimental Study of Mismatching ESS-subnet Handoffs on IP over IEEE 802.11 WLANs'", Eighth International Conference on Wireless and Optical Communications Networks (WOCN), 20110524, IEEE, pp. 1-5.

\* cited by examiner

*Primary Examiner* — Pao Sinkantarakorn
(74) *Attorney, Agent, or Firm* — Locke Lord LLP

(57) ABSTRACT

Method, apparatus, and computer program product embodiments of the invention are disclosed to improve the discovery of wireless networks having desired service offerings. In example embodiments of the invention, a method comprises: transmitting a wireless generic advertisement service request to a multicast address of a multicast group of wireless devices or to a broadcast address, specifying one or more required characteristics; and receiving one or more wireless generic advertisement service responses from only one or more of the plurality of wireless devices having the specified characteristics.

22 Claims, 19 Drawing Sheets

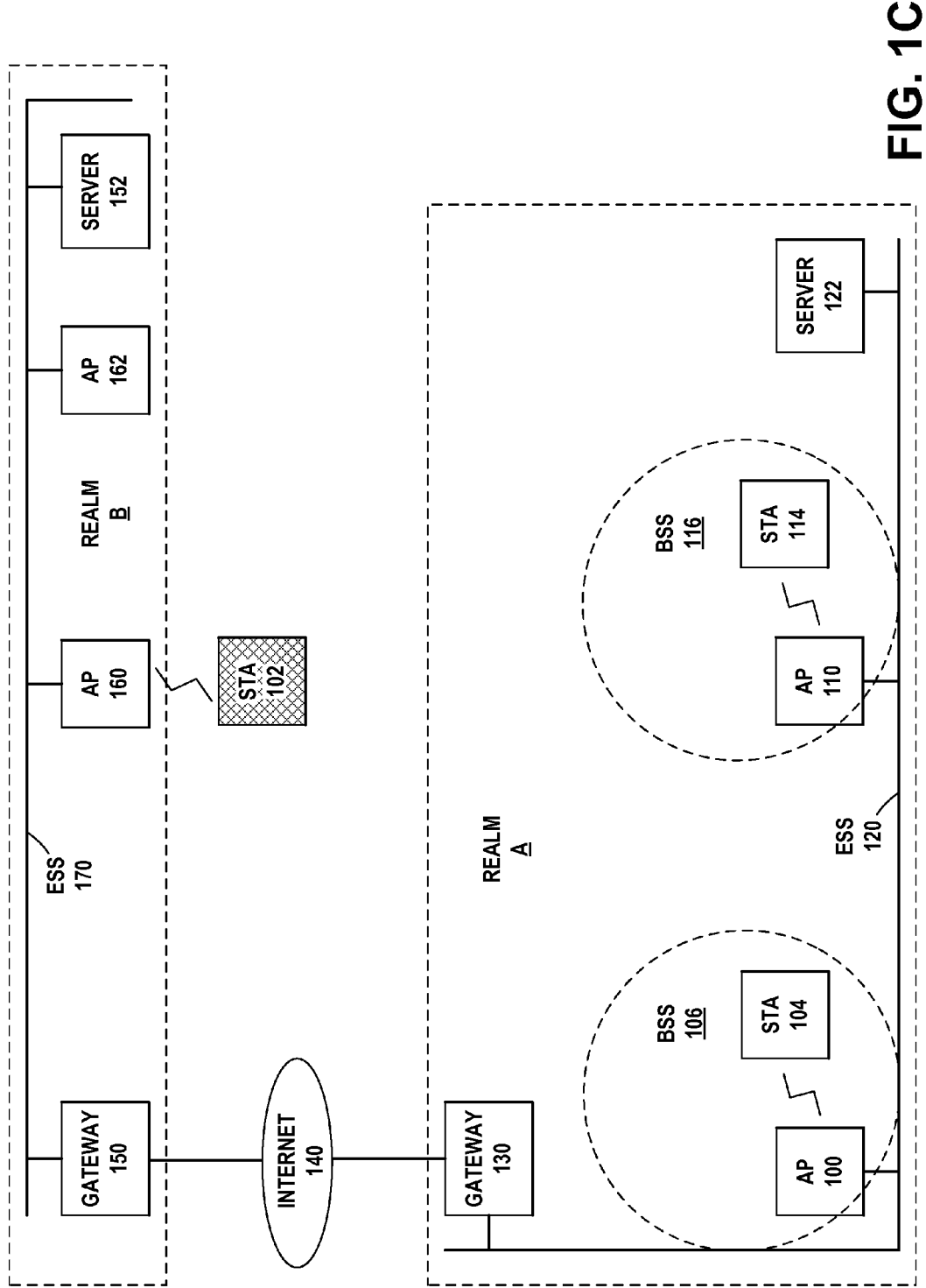

GAS INITIAL REQUEST 250

GAS INITIAL RESPONSE 260

ANQP information ID definitions

| Information name | Information ID |
|---|---|
| Reserved | 0 – 255 |
| ANQP Query list | 256 |
| ANQP Capability list | 257 |
| Venue Name information | 258 |
| Emergency Call Number information | 259 |
| Network Authentication Type information | 260 |
| Roaming Consortium list | 261 |
| IP Address Type Availability information | 262 |
| NAI Realm list | 263 |
| Emergency Alert Identifier URI | 269 |
| Emergency NAI | 271 |
| RESPONSE CONDITION | 272 |
| Reserved | 56798 – 65535 |

NEW VALUE FOR "RESPONSE CONDITION", E.G. "272"

FIG. 3D

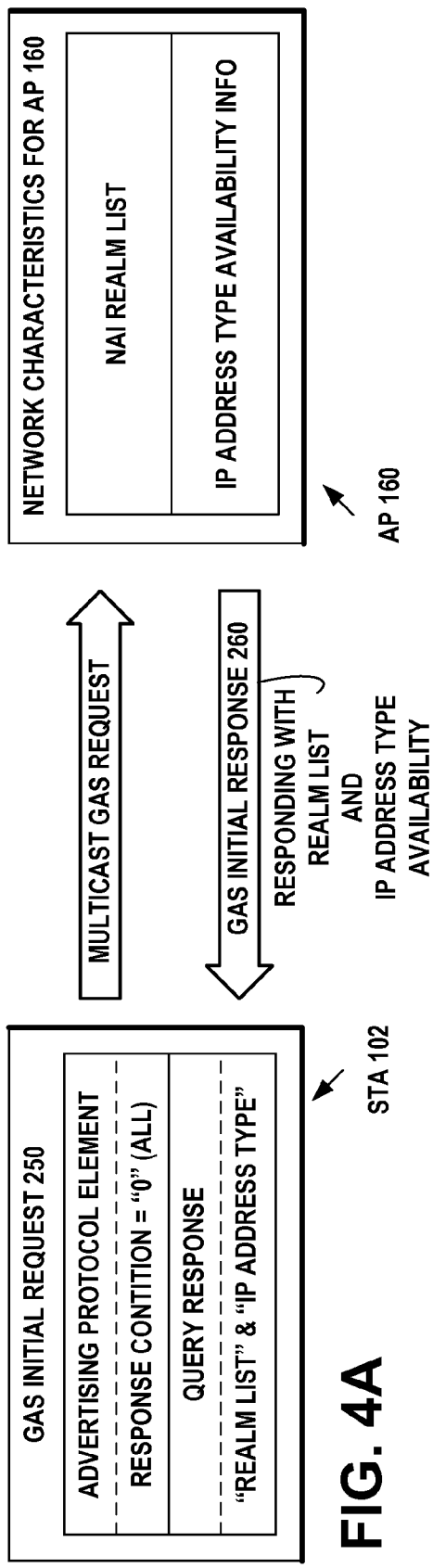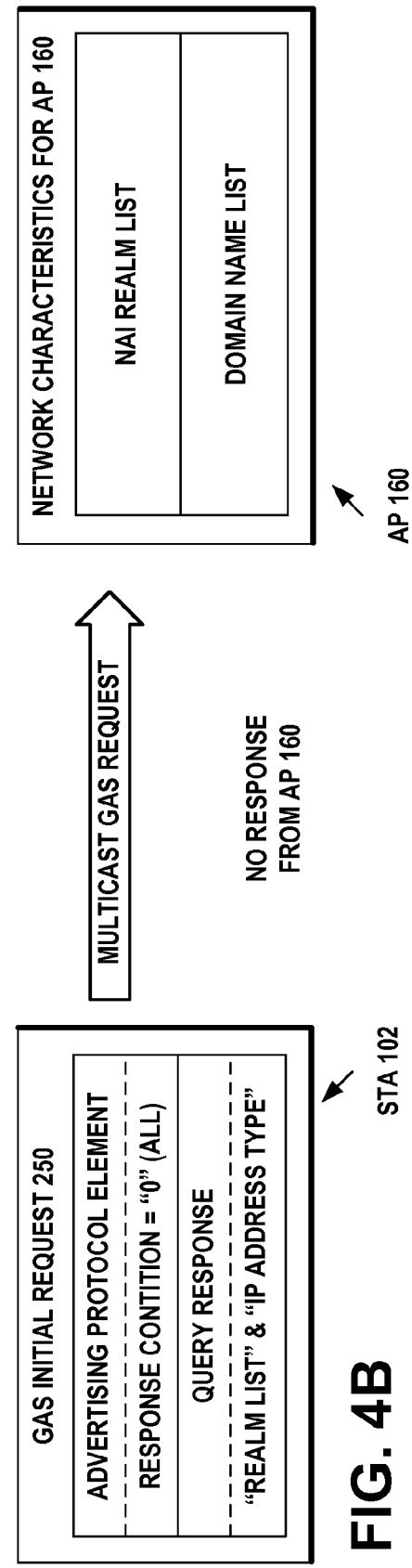

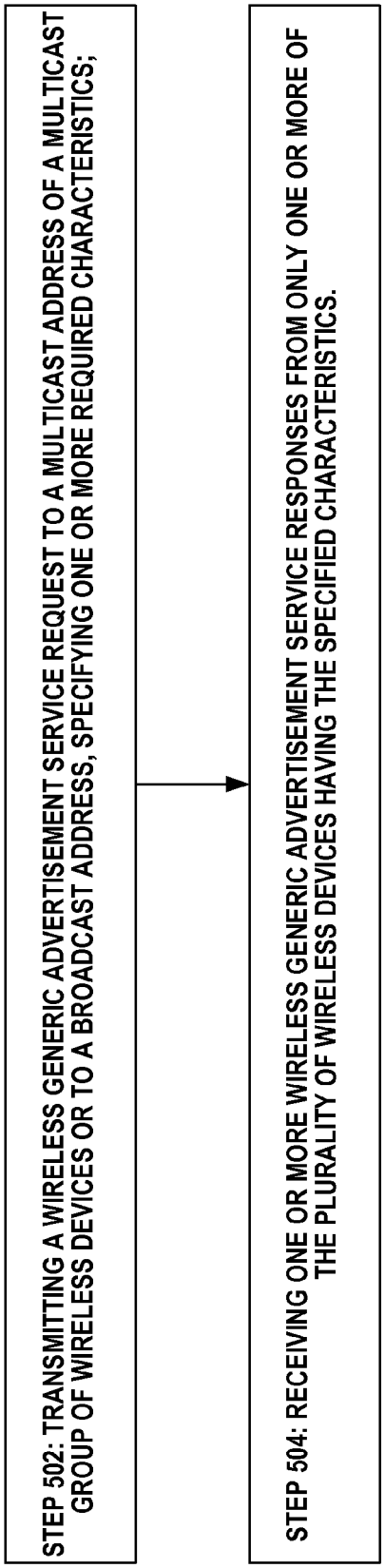

FIG. 5A

PROCESS IN MOBILE WIRELESS DEVICE STA 102

STEP 502: TRANSMITTING A WIRELESS GENERIC ADVERTISEMENT SERVICE REQUEST TO A MULTICAST ADDRESS OF A MULTICAST GROUP OF WIRELESS DEVICES OR TO A BROADCAST ADDRESS, SPECIFYING ONE OR MORE REQUIRED CHARACTERISTICS;

STEP 504: RECEIVING ONE OR MORE WIRELESS GENERIC ADVERTISEMENT SERVICE RESPONSES FROM ONLY ONE OR MORE OF THE PLURALITY OF WIRELESS DEVICES HAVING THE SPECIFIED CHARACTERISTICS.

FIG. 5B

PROCESS IN ACCESS POINT DEVICE AP 160

550 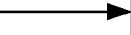

STEP 552: RECEIVING A WIRELESS GENERIC ADVERTISEMENT SERVICE REQUEST TO A MULTICAST ADDRESS OF A MULTICAST GROUP OF WIRELESS DEVICES OR TO A BROADCAST ADDRESS, SPECIFYING ONE OR MORE REQUIRED CHARACTERISTICS;

STEP 554: TRANSMITTING A WIRELESS GENERIC ADVERTISEMENT SERVICE RESPONSE ONLY IF THE SPECIFIED CHARACTERISTICS ARE AVAILABLE.

FIG. 5C

PROCESS IN
MOBILE WIRELESS
DEVICE STA 102

560 →

STEP 562: GROUPCASTING OR BROADCASTING A WIRELESS REQUEST TO A PLURALITY OF WIRELESS DEVICES, SPECIFYING ONE OR MORE REQUIRED CHARACTERISTICS, THE REQUEST INCLUDING AT LEAST ONE OF AN INDICATION THAT ANY OF THE ONE OR MORE CHARACTERISTICS IS REQUIRED, AN INDICATION THAT A SUBSET OF THE ONE OR MORE CHARACTERISTICS IS REQUIRED, OR AN INDICATION THAT ALL OF THE ONE OR MORE CHARACTERISTICS ARE REQUIRED;

↓

STEP 564: RECEIVING ONE OR MORE WIRELESS RESPONSES FROM ONLY ONE OR MORE OF THE PLURALITY OF WIRELESS DEVICES HAVING THE SPECIFIED CHARACTERISTICS.

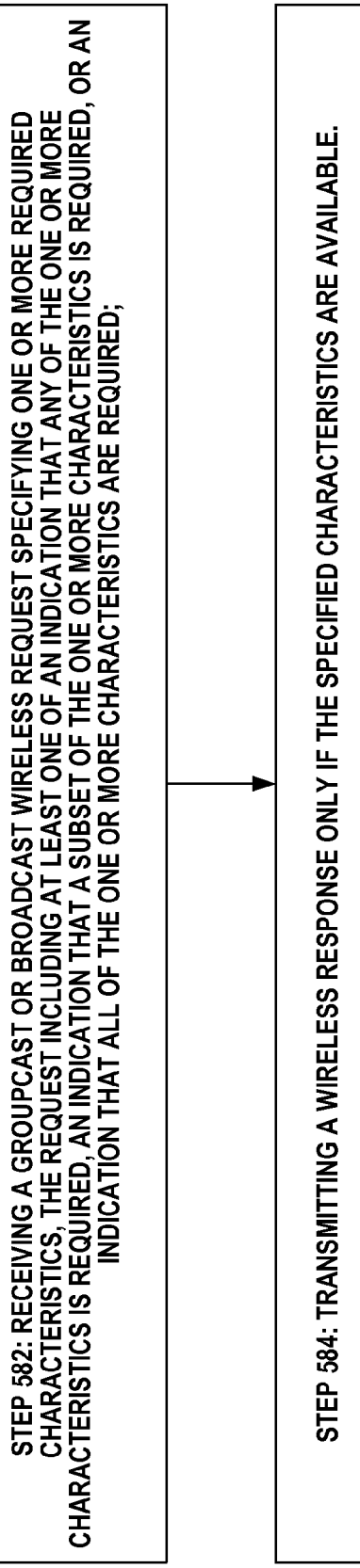

FIG. 5D

PROCESS IN ACCESS POINT DEVICE AP 160

STEP 582: RECEIVING A GROUPCAST OR BROADCAST WIRELESS REQUEST SPECIFYING ONE OR MORE REQUIRED CHARACTERISTICS, THE REQUEST INCLUDING AT LEAST ONE OF AN INDICATION THAT ANY OF THE ONE OR MORE CHARACTERISTICS IS REQUIRED, AN INDICATION THAT A SUBSET OF THE ONE OR MORE CHARACTERISTICS IS REQUIRED, OR AN INDICATION THAT ALL OF THE ONE OR MORE CHARACTERISTICS ARE REQUIRED;

STEP 584: TRANSMITTING A WIRELESS RESPONSE ONLY IF THE SPECIFIED CHARACTERISTICS ARE AVAILABLE.

Advertisement protocol ID definitions

| Name | Value |
|---|---|
| Access Network Query Protocol (ANQP) | 0 |
| MIH Information Service | 1 |
| MIH Command and Event Services Capability Discovery | 2 |
| Emergency Alert System (EAS) | 3 |
| Reserved | 4 – 220 |
| Vendor Specific | 221 |
| Reserved | 222 – 255 |

FIG. 6

| Info ID | Length | NAI Realm Count | NAI Realm Data #1 (optional) | NAI Realm Data #2 (optional) | ... | NAI Realm Data #n (optional) |
|---|---|---|---|---|---|---|
| 2 | 2 | 2 | variable | variable | | variable |

Octets:

NAI Realm list format

FIG. 7A

| Info ID | Length | OI Duple #1 (optional) | OI Duple #2 (optional) | ... | OI Duple #N (optional) |
|---|---|---|---|---|---|
| 2 | 2 | variable | variable | | variable |

Octets:

Roaming Consortium list format

FIG. 7B

| OI Length | OI |
|---|---|
| 1 | variable |

Octets:

OI Duple format

| Info ID | Length | Domain Name field #1 (optional) | Domain Name field #2 (optional) | ... | Domain Name field #N (optional) |
|---|---|---|---|---|---|
| 2 | 2 | variable | variable | | variable |

Octets:

Domain Name list format

FIG. 7E

| Length | Domain Name |
|---|---|
| 1 | variable |

Octets:

Domain Name field format

METHOD, APPARATUS, AND COMPUTER PROGRAM PRODUCT FOR ROAMING PARTNER DISCOVERY

FIELD

The embodiments relate to wireless communication, and more particularly to improvements in discovering wireless networks having desired service offerings.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Method, apparatus, and computer program product embodiments of the invention are disclosed to improve the discovery of wireless networks having desired service offerings. Example embodiments of the invention enable a roaming wireless device to reduce the number of requests it makes to discover desired service offerings, thereby reducing its expenditure of power and time to complete discovery procedures. Example embodiments of the invention reduce the number of responses from access points to service discovery requests, thereby reducing the use of bandwidth. Example embodiments of the invention reduce the setup time needed by a roaming mobile wireless device to configure its WLAN interface when initially accessing an access point in a remote realm different from its home realm. Example embodiments of the invention reduce the time required for a roaming mobile wireless device to perform network detection, discovery, and selection in a remote realm.

In example embodiments of the invention, a method comprises:

transmitting a wireless generic advertisement service request to a multicast address of a multicast group of wireless devices or to a broadcast address, specifying one or more required characteristics; and receiving one or more wireless generic advertisement service responses from only one or more of the plurality of wireless devices having the specified characteristics.

An example embodiment of the invention further comprises a method wherein some of the plurality of wireless devices are access points belonging to a realm specified in the request.

An example embodiment of the invention further comprises a method wherein some of the plurality of wireless devices are access points belonging to a realm having a roaming agreement with a home realm.

An example embodiment of the invention further comprises a method wherein the one or more required characteristics specified by the request is at least one of being an access point belonging to a realm specified in the request or being an access point belonging to a realm having a roaming agreement with a home realm.

In example embodiments of the invention, an apparatus comprises:

at least one processor;

at least one memory including computer program code;

the at least one memory and the computer program code configured to, with the at least one processor, cause the device at least to:

generate a generic advertisement service request to be wirelessly transmitted to a multicast address of a multicast group of wireless devices or to a broadcast address, specifying one or more required characteristics; and receive one or more wireless generic advertisement service responses from only one or more of the plurality of wireless devices having the specified characteristics.

An example embodiment of the invention further comprises a computer program product comprising computer executable program code recorded on a computer readable, non-transitory storage medium, the computer executable program code, when executed by a computer processor, comprising:

code for transmitting a wireless generic advertisement service request to a multicast address of a multicast group of wireless devices or to a broadcast address, specifying one or more required characteristics; and code for receiving one or more wireless generic advertisement service responses from only one or more of the plurality of wireless devices having the specified characteristics.

In example embodiments of the invention, a method comprises:

receiving a wireless generic advertisement service request to a multicast address of a multicast group of wireless devices or to a broadcast address, specifying one or more required characteristics; and transmitting a wireless generic advertisement service response only if the specified characteristics are available.

In example embodiments of the invention, an apparatus comprises:

at least one processor;

at least one memory including computer program code;

the at least one memory and the computer program code configured to, with the at least one processor, cause the device at least to:

receive a wireless generic advertisement service request to a multicast address of a multicast group of wireless devices or to a broadcast address, specifying one or more required characteristics; and generate a generic advertisement service response to be wirelessly transmitted only if the specified characteristics are available.

In example embodiments of the invention, a method comprises:

groupcasting or broadcasting a wireless request to a plurality of wireless devices, specifying one or more required characteristics, the request including at least one of an indication that any of the one or more characteristics is required, an indication that a subset of the one or more characteristics is required, or an indication that all of the one or more characteristics are required; and receiving one or more wireless responses from only one or more of the plurality of wireless devices having the specified characteristics.

An example embodiment of the invention further comprises a method wherein the request specifies that in order to respond to the request, one or more of the plurality of wireless devices must belong to a realm specified in the request or that in order to respond to the request, one or more of the plurality of wireless devices must belong to a realm that has a roaming relationship with a realm specified in the request.

An example embodiment of the invention further comprises a method wherein the wireless request is a generic advertisement service initial request frame and the one or more wireless responses is a generic advertisement service initial response frame.

An example embodiment of the invention further comprises a method wherein some of the plurality of wireless devices are access points belonging to a realm having a roaming agreement with a home realm.

In example embodiments of the invention, an apparatus comprises:

at least one processor;

at least one memory including computer program code;

the at least one memory and the computer program code configured to, with the at least one processor, cause the device at least to:

generate a request to be wirelessly groupcast or broadcast to a plurality of wireless devices, specifying one or more required characteristics, the request including at least one of an indication that any of the one or more characteristics is required, an indication that a subset of the one or more characteristics is required, or an indication that all of the one or more characteristics are required; and receive one or more wireless responses from only one or more of the plurality of wireless devices having the specified characteristics.

An example embodiment of the invention further comprises a computer program product comprising computer executable program code recorded on a computer readable, non-transitory storage medium, the computer executable program code, when executed by a computer processor, comprising:

code for groupcasting or broadcasting a wireless request to a plurality of wireless devices, specifying one or more required characteristics, the request including at least one of an indication that any of the one or more characteristics is required, an indication that a subset of the one or more characteristics is required, or an indication that all of the one or more characteristics are required; and code for receiving one or more wireless responses from only one or more of the plurality of wireless devices having the specified characteristics.

In example embodiments of the invention, a method comprises:

receiving a groupcast or broadcast wireless request specifying one or more required characteristics, the request including at least one of an indication that any of the one or more characteristics is required, an indication that a subset of the one or more characteristics is required, or an indication that all of the one or more characteristics are required; and transmitting a wireless response only if the specified characteristics are available.

In example embodiments of the invention, an apparatus comprises:

at least one processor;

at least one memory including computer program code;

the at least one memory and the computer program code configured to, with the at least one processor, cause the device at least to:

receive a groupcast or broadcast wireless request specifying one or more required characteristics, the request including at least one of an indication that any of the one or more characteristics is required, an indication that a subset of the one or more characteristics is required, or an indication that all of the one or more characteristics are required; and generate a response to be wirelessly transmitted only if the specified characteristics are available.

In this manner, embodiments of the invention improve the discovery of wireless networks having desired service offerings.

DESCRIPTION OF THE FIGURES

FIG. 1C illustrates the example interworking architecture of FIG. 1B, with the mobile wireless device in the second realm, requesting an NAI realm list and IP address type availability information from the third access point, in accordance with an example embodiment of the invention.

FIG. 3D illustrates an example ANQP Information ID Definitions, in accordance with an example embodiment of the invention.

FIG. 4A illustrates an example of the mobile wireless device and the third access point of FIGS. 2A and 2B, with the mobile wireless device multicasting a generic advertisement service (GAS) initial request frame containing a response condition requiring that all specified characteristics must be present at the access point before a response may be made, and the third access point is shown transmitting a generic advertisement service (GAS) initial response frame containing all of the specified characteristics, in accordance with an example embodiment of the invention.

FIG. 4B illustrates an example of the mobile wireless device and the third access point of FIGS. 2A and 2B, with the mobile wireless device multicasting a generic advertisement service (GAS) initial request frame containing a response condition requiring that all specified characteristics must be present at the access point before a response may be made, and the third access point is shown not transmitting a response since the access point does not have all of the specified characteristics, in accordance with an example embodiment of the invention.

FIG. 5A is an example flow diagram of operational steps of an example embodiment of the procedure performed in the mobile wireless device, according to an embodiment of the present invention.

FIG. 5B is an example flow diagram of operational steps of an example embodiment of the procedure performed in the access point device, according to an embodiment of the present invention.

FIG. 5C is an example flow diagram of operational steps of an example embodiment of the procedure performed in the mobile wireless device, according to an embodiment of the present invention.

FIG. 5D is an example flow diagram of operational steps of an example embodiment of the procedure performed in the access point device, according to an embodiment of the present invention.

FIG. 6 illustrates example Advertisement Protocol ID Definitions, in accordance with an example embodiment of the invention.

FIG. 7A illustrates an example NAI Realm List Format, in accordance with an example embodiment of the invention.

FIG. 7B illustrates an example Roaming Consortium List Format, in accordance with an example embodiment of the invention.

FIG. 7C illustrates an example OI Duple Format, in accordance with an example embodiment of the invention.

FIG. 7D illustrates an example Domain Name List Format, in accordance with an example embodiment of the invention.

FIG. 7E illustrates an example Domain Name Field Format, in accordance with an example embodiment of the invention.

DISCUSSION OF EXAMPLE EMBODIMENTS

Figure 1A:
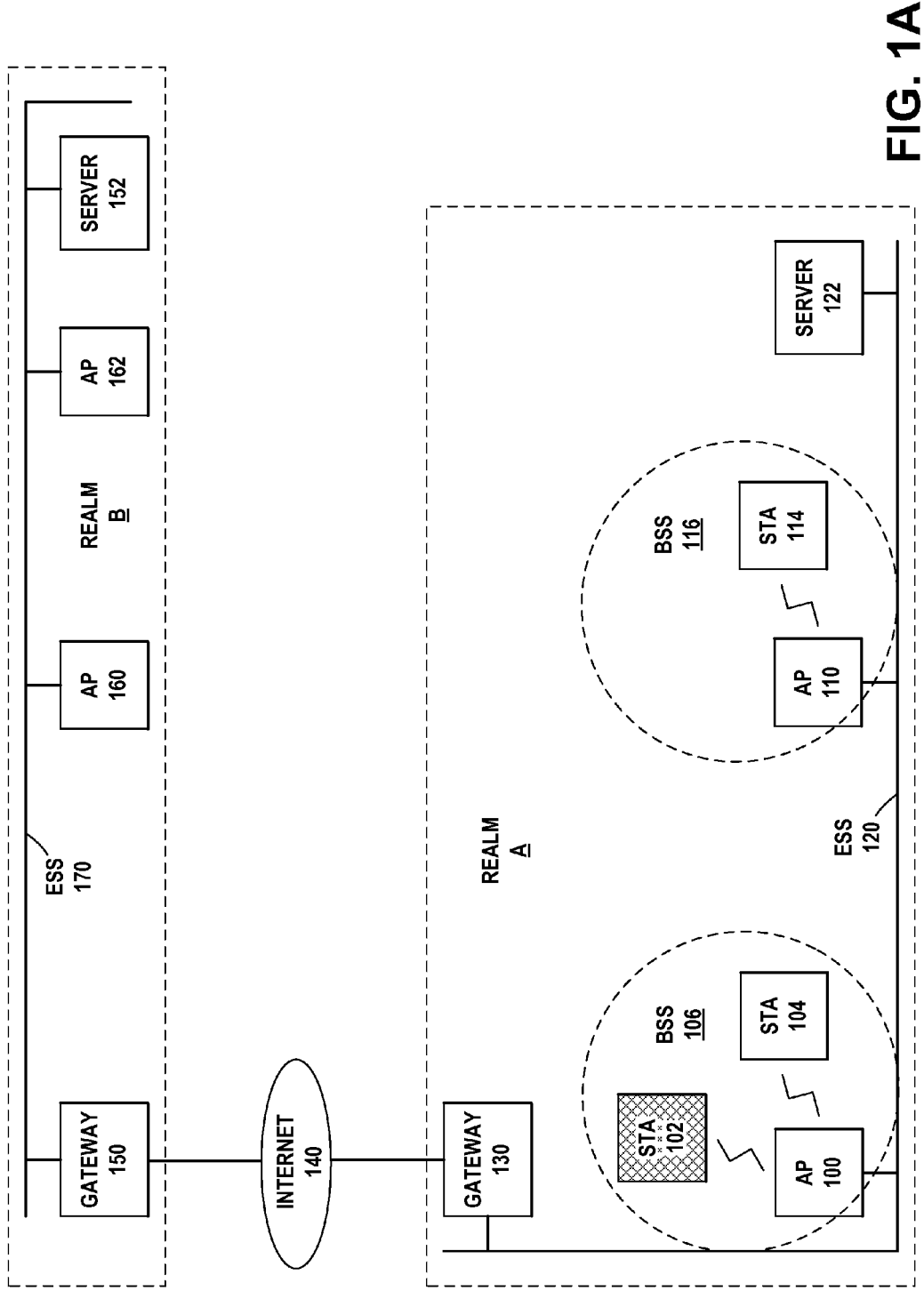
FIG. 1A illustrates an example interworking architecture with a mobile wireless device connected to a first access point accessible with first credentials in a first realm, the first realm containing an ESS with two infrastructure BSS networks and a gateway connected over the internet to a second gateway in a second realm containing an infrastructure BSS network with a third access point accessible with second credentials.

A WLAN may be organized as an independent basic service set (IBSS) or an infrastructure basic service set (BSS). Wireless devices in an independent basic service set (IBSS) communicate directly with one another and there is no access point in the IBSS. An infrastructure basic service set (BSS) includes a wireless access point (AP) that may be connected to one or more servers and peripheral devices by a wired backbone connection. In an infrastructure BSS, the access point is a central hub to which mobile wireless devices are wirelessly connected. The mobile wireless devices typically do not communicate directly with one another, but communicate indirectly through the access point. An access point may be connected to other access points by a wired backbone connection in an extended service set (ESS). Mobile wireless devices may roam from one wireless connection with one access point to a second wireless connection with a second access point in the ESS, and still be linked to the first access point in the ESS via the wired backbone connection. The user's mobile wireless device is typically authenticated to connect with any of the access points in the ESS, in what is referred to as the user's home realm. "Home realm" is the realm where the user's WLAN subscription credentials are valid. There may be multiple subscriptions and the mobile device may consider multiple realms as home realms.

When the user of a mobile wireless device wants to connect to an access point, there are a few possibilities: The device can try to find a free WLAN network (which may be cumbersome, as free WLAN networks usually require the user to launch the browser and accept terms and conditions, a step which the device can not do automatically and seamlessly to the user), or use one of the existing credentials it has. To connect to a WLAN network with existing credentials, the device has these two possibilities: [1] The wireless device may connect to an access point in a network belonging to the home realm to which the user has credentials; [2] The wireless device may connect to an access point in a WLAN belonging to a remote realm to which the user's home realm has a roaming agreement enabling the user to use the home realm's credentials. If existing device credentials can not be used with any of the available networks, the mobile wireless device may attempt to buy a subscription from an access point in a WLAN belonging to a remote realm for which there is no roaming agreement with any of the home realms the credentials the user/device possesses belong to. From convenience and seamless operation point of view, it is desirable that the device attempts to use existing credentials to connect to one of the available access points. During the procedure for selecting an access point, the mobile wireless device needs to discover whether any of the access points available at the current location belong to the (at least one of the) user possessed credential's home realm, or whether the remote realm to which an access point is connected has a roaming agreement with any of those home realm.

The IEEE 802.11 standard specifies methods and techniques of wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard IEEE 802.11-2007, Wireless Medium Access Control (MAC) and Physical Layer (PHY) Specifications, June 2007 (incorporated herein by reference). Since then, emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

IEEE 802.11u-2011 is an amendment to the IEEE 802.11-2007 base standard published as IEEE 802.11u-2011, Wireless LAN Medium Access Control (MAC) and Physical Layer (PHY) Specifications, Amendment 9: Interworking with External Networks, Feb. 25, 2011 (incorporated herein by reference). IEEE 802.11u-2011 adds features to improve interworking with external networks. IEEE 802.11u-2011 amendment establishes medium access control (MAC) and physical layer (PHY) protocols for an interworking service to permit a wireless mobile device to exchange information with an external network, to enable the selection of networks to connect to, and to enable access to emergency services. A Generic Advertisement Service (GAS) is specified in the IEEE 802.11u amendment to enable mobile wireless devices or STAs to discover the availability of information related to desired network services. For example, Generic Advertisement Service (GAS) enables discovery of information about services provided in an independent basic service set (IBSS), information about local access services, information from available Subscription Service Providers (SSP) and/or Subscription Service Provider Networks (SSPNs) or other external networks. Generic Advertisement Service (GAS) enables a wireless mobile device to transmit a Generic Advertisement Service (GAS) initial request frame to request information about network services from access points and it enables an access point to use a generic container, a Generic Advertisement Service (GAS) initial response frame, to advertise information about network services over an IEEE 802.11 network. Public Action frames are used to transport the Generic Advertisement Service (GAS) initial request frame and the Generic Advertisement Service (GAS) initial response frame.

The current procedures specified in the IEEE 802.11u amendment for the generic advertisement service (GAS) protocol, require that the mobile device issue a unicast GAS request separately to each access point (AP). Where there are dense networks with many access points, the mobile device may transmit many GAS requests, which will consume power and time. Additionally, the current procedures require a GAS response from all of the access points receiving a GAS request. This may create a waste of bandwidth, since there may be responses transmitted from many access points that are not relevant at all for the roaming mobile device.

As WLANs have become more common, it is likely that users who roam outside of their home realm will encounter access points in WLANs for which no pre-configured settings are available, and yet which offer desired services and the ability to successfully authenticate with the user's home realm. The user's home realm may have roaming agreements with remote realms to which a user may authenticate to his home realm. However, there may be other remote realms for which there is no roaming agreement. In such circumstances, the mobile wireless device may determine which access point to connect to, and how to authenticate to that access point.

In embodiments of the invention, the setup time is reduced for a roaming mobile wireless device configuring its WLAN interface, when initially accessing an access point in a remote realm different from its home realm. In embodiments of the invention, a roaming mobile wireless device is able to reduce the interval necessary to perform network detection, discovery, selection, authentication and IP configuration in a remote realm.

FIG. 1A illustrates an example interworking architecture with a mobile wireless device STA 102 connected to a first access point AP 100 accessible with first credentials in a first realm A, the first realm A containing an ESS 120 with two infrastructure BSS networks 106 and 116 and a gateway 130 connected over the Internet 140 to a second gateway 150 in a second realm B containing an infrastructure BSS network with a third access point 160 and another access point 162 accessible with second credentials.

The mobile wireless device STA 102 may exchange a Probe Request and Probe Response with the access point AP 100 in the BSS 106. In the infrastructure BSS 106, the AP 100 will always respond to probe requests. The probe response sent back by the AP 100 contains a timestamp, beacon interval, and capability information. It also includes the Service Set Identity (SSID) of the BSS 106, supported rates, and PHY parameters. The mobile wireless device STA 102 learns that the access point AP 100 will accept STA 100's credentials that are valid throughout the realm A.

Figure 1B:
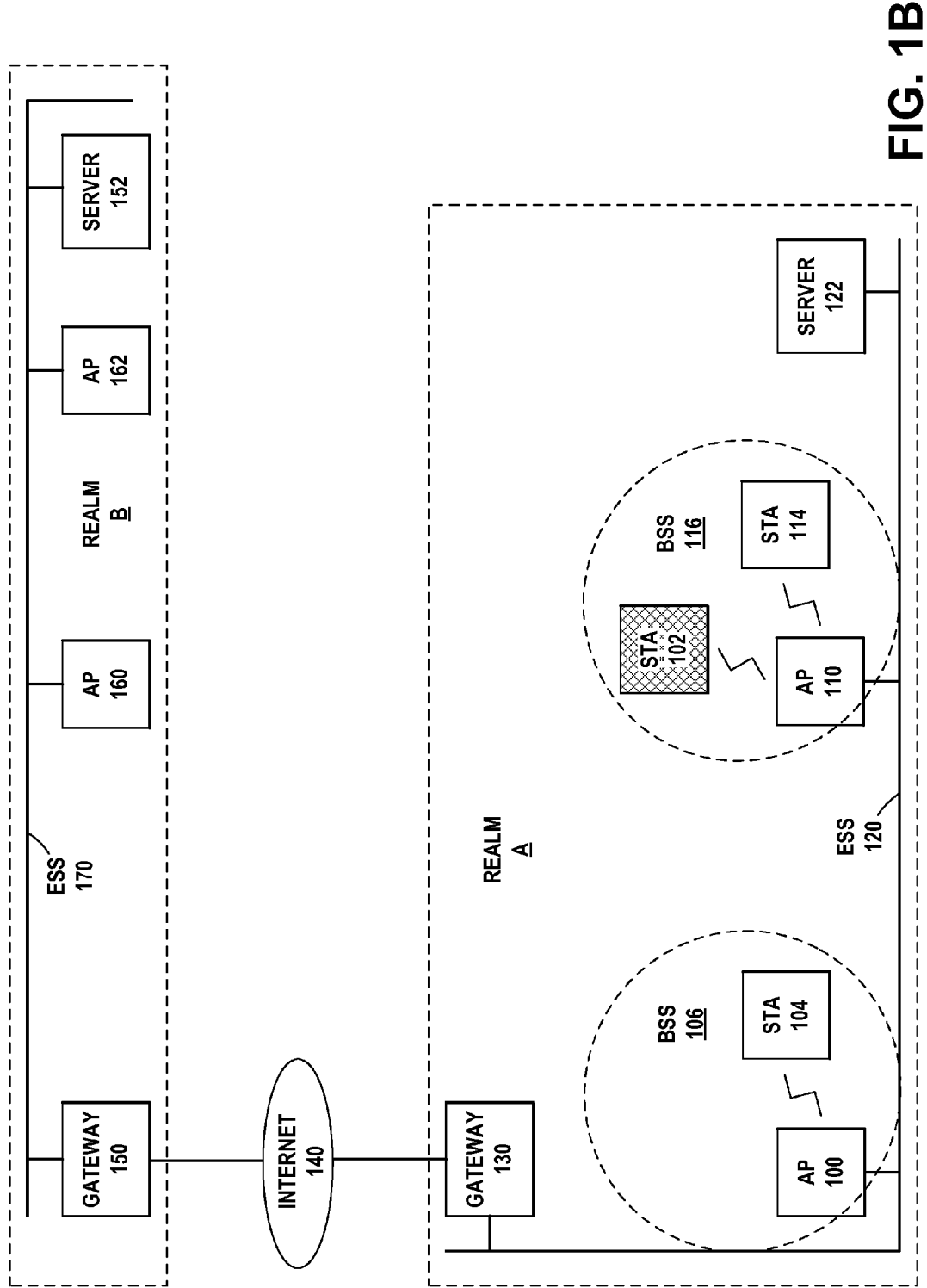
FIG. 1B illustrates the example interworking architecture of FIG. 1A, with the mobile wireless device connected to a second access point with the first credentials in the first realm.

FIG. 1B illustrates the example interworking architecture of FIG. 1A, with the mobile wireless device STA 102 having roamed to a second BSS 116 in the ESS 120, where it exchanges a Probe Request and Probe Response with the access point AP 110. Since access point AP 110 is in the same realm A, the mobile wireless device STA 102 may connect to the second access point AP 110 with the first credentials of the realm A. A typical characteristic for selecting a network in a roaming case is the realm or fully qualified domain name (FQDN) to which the access point belongs.

FIG. 1C illustrates the example interworking architecture of FIG. 1B, with the mobile wireless device STA 102 having roamed to a second ESS 170 in a second realm B, where it exchanges a Probe Request and Probe Response with a third access point AP 160. The mobile wireless device STA 102 learns that the third access point AP 160 has an unfamiliar SSID and will not accept STA 100's credentials.

Figure 2A:
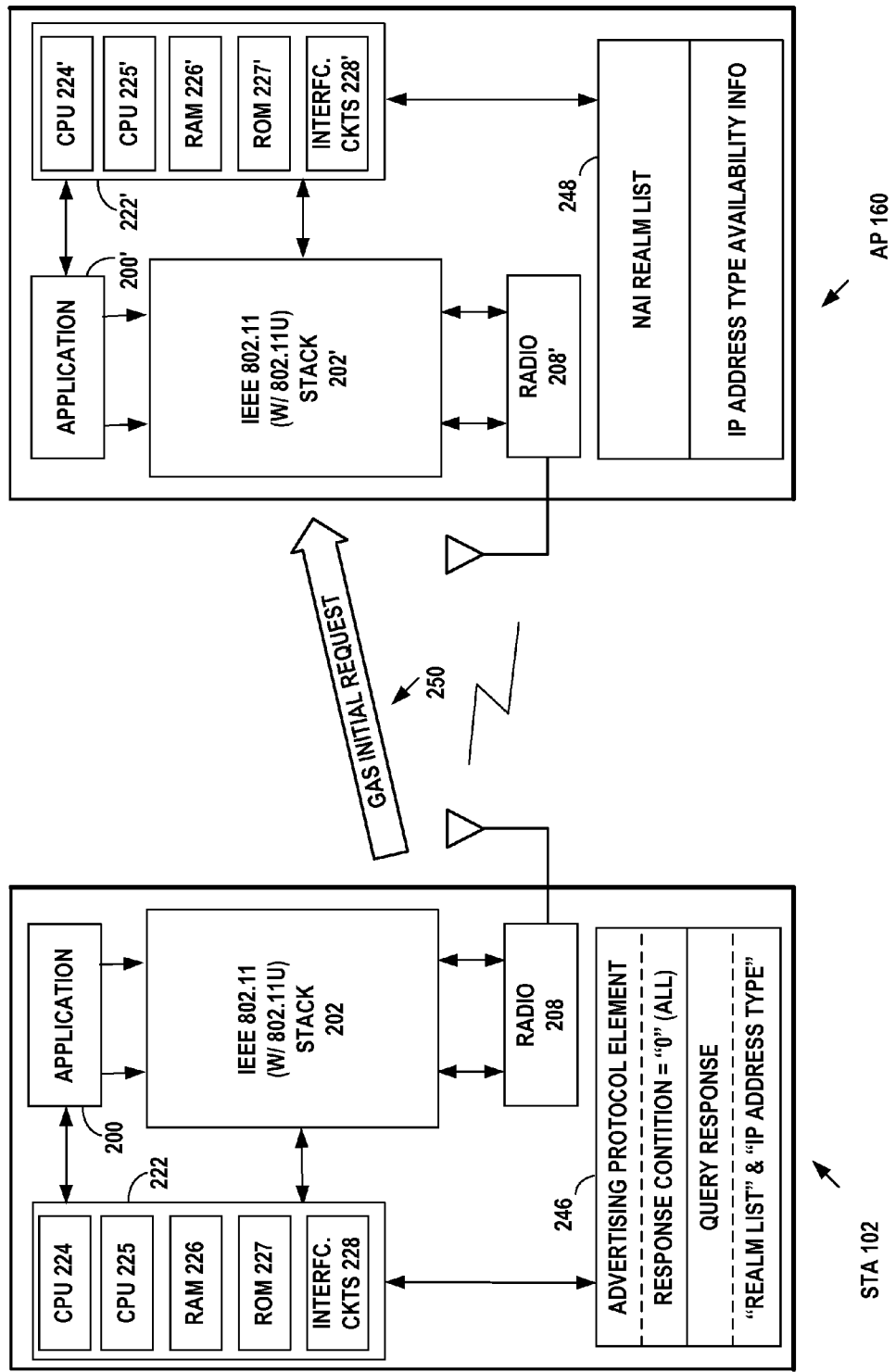
FIG. 2A illustrates an example wireless network and functional block diagram of the mobile wireless device and the third access point in the second realm, with the mobile wireless device groupcasting a generic advertisement service (GAS) initial request frame, in accordance with an example embodiment of the invention.

Therefore, in accordance with example embodiments of the invention, mobile wireless device STA 102 multicasts or broadcasts a generic advertisement service (GAS) initial request frame 250, as shown in FIG. 2A. The generic advertisement service (GAS) initial request frame 250 requests whether any access point within range as a required characteristic of possessing an NAI realm list, to enable determining whether the responding access point belongs to a network having a roaming agreement with STA 102's home realm A. The request also requests whether any access point within range as a required characteristic of possessing IP address type availability information. In accordance with example embodiments of the invention, the generic advertisement service (GAS) initial request frame 250 also contains a response condition that all of the required characteristics that it requests must be possessed by an access point receiving the request 250, before that access point may respond to the request 250 by sending the requested information.

FIG. 2A illustrates an example wireless network and functional block diagram of the mobile wireless device STA 102 and the third access point AP 160 in the second realm A, with the mobile wireless device STA 102 multicasting a generic advertisement service (GAS) initial request frame 250, in accordance with an example embodiment of the invention.

Figure 3A:
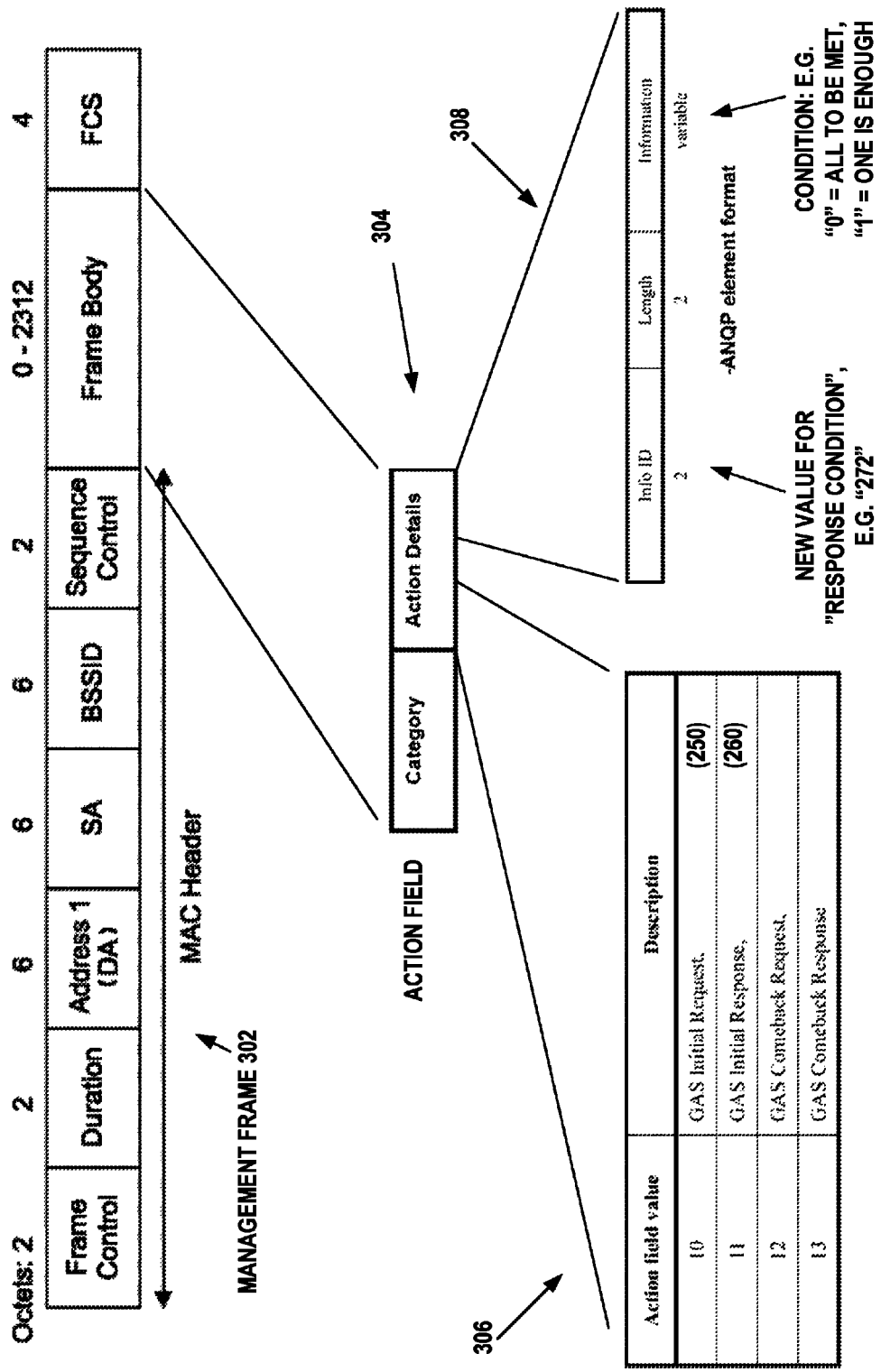
FIG. 3A illustrates an example Generic Advertisement Service (GAS) initial request frame is in the action field of an IEEE 802.11 MAC management frame, in accordance with an example embodiment of the invention.

In accordance with example embodiments of the invention, the mobile wireless device STA 102 transmits the Generic Advertisement Service (GAS) initial request frame 250 as a groupcast, which may be either a broadcast or a multicast. The IEEE 802.11 MAC management frame 302 shown in FIG. 3A has the frame control field indicate that this is a management frame, the frame type and subtype fields are set to indicate an action frame. The frame body the category field that indicates a public action frame to allow communications between an access point and an unassociated STA. The public action field 304 may be set to one of several values indicated in the table 306. An action field value of 10 indicates a GAS Initial Request, transmitted by a requesting STA to request information from another STA. An action field value of 11 indicates a GAS Initial Response, transmitted by a STA responding to a GAS Initial Request frame. An action field value of 12 indicates a GAS Comeback Request, transmitted by a requesting STA to a responding STA. An action field value of 13 indicates a GAS Comeback Response, transmitted by a responding STA to a requesting STA.

Figure 3B:
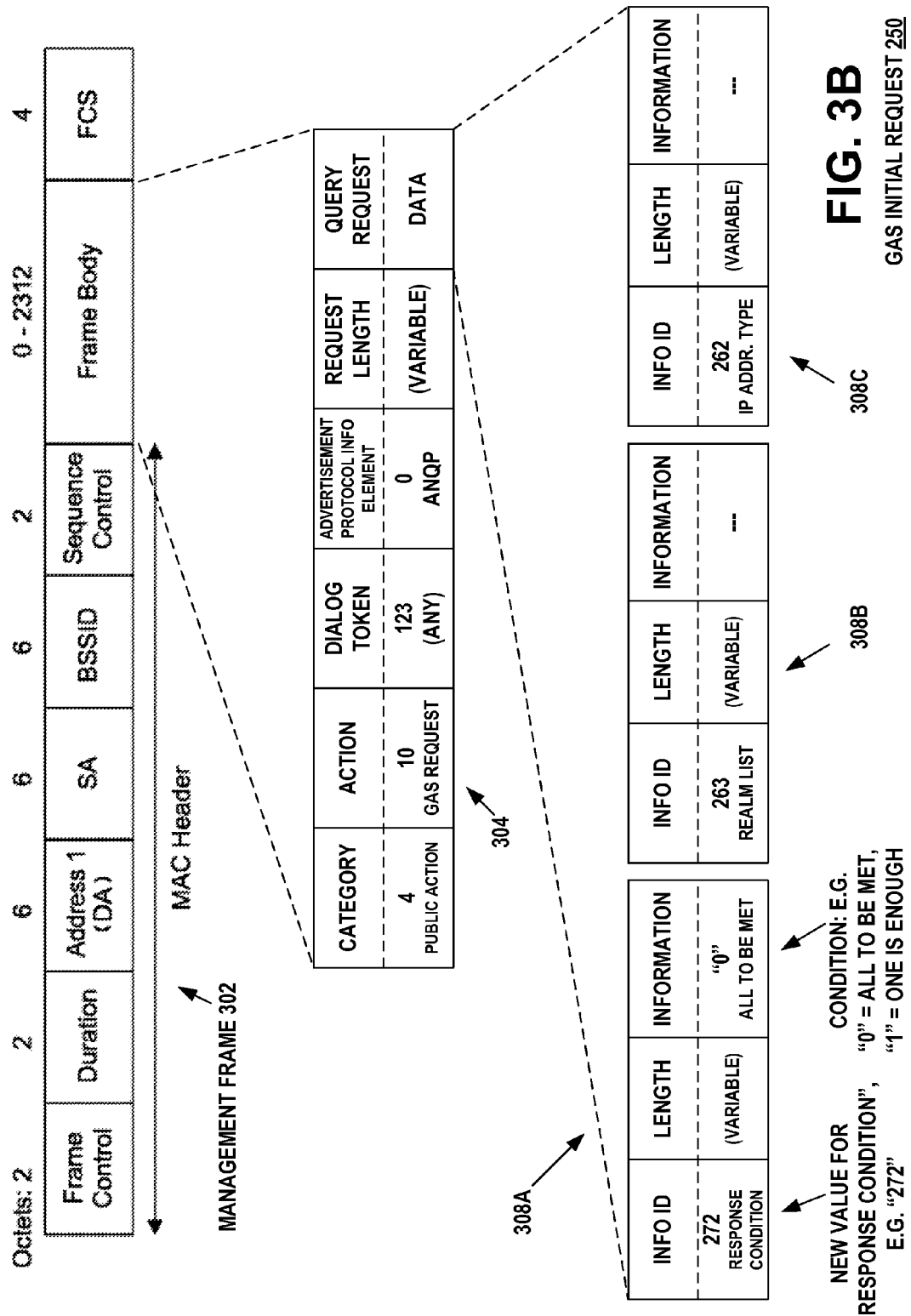
FIG. 3B illustrates an example frame body format of the Generic Advertisement Service (GAS) Initial Request Frame, in accordance with an example embodiment of the invention.

FIG. 3B illustrates an example frame body format of the Generic Advertisement Service (GAS) Initial Request Frame 250 in the MAC management frame 302. The frame body format of the GAS initial request frame 250 shown in FIG. 3B, includes the category field that indicates a public action frame with Category field value 4, to allow communications between an access point and an unassociated STA. The public action field value 304 is set to value of 10 or 11 to indicate GAS initial request or GAS initial response, respectively. The advertisement information protocol element field specifies an advertisement protocol ID of "0", which is defined in FIG. 6 as the access network query protocol (ANQP) format for the ANQP element 308.

ANQP elements 308 are defined to have a common format consisting of a 2-octet Info ID field, a 2-octet length field, and a variable-length element-specific information field. Each element is assigned a unique Info ID as shown in the ANQP Information ID definitions of FIG. 3D.

As shown in FIG. 3B, when the public action field 304 is set to value of 10 to indicate GAS initial request 250, several ANQP information elements 308 may be sent in the query request field. For example, the information field of the ANQP element 308A contains the response condition, such as "0"="all to be met" or "1"="one is enough". The ANQP elements 308B and 308C respectively contain the query request "263"="realm list" and "262"="IP address type" sent from the mobile wireless device STA 102 to the access point AP 160. The dialog token field is set by the requesting station with any value, such as "123", to identify the GAS initial request frame. The GAS initial request frame 250 includes a length value for the length of the following query request field. The Generic Advertisement Service (GAS) initial request frame 250 may be used for interworking between wireless networks in different realms.

Figure 3C:
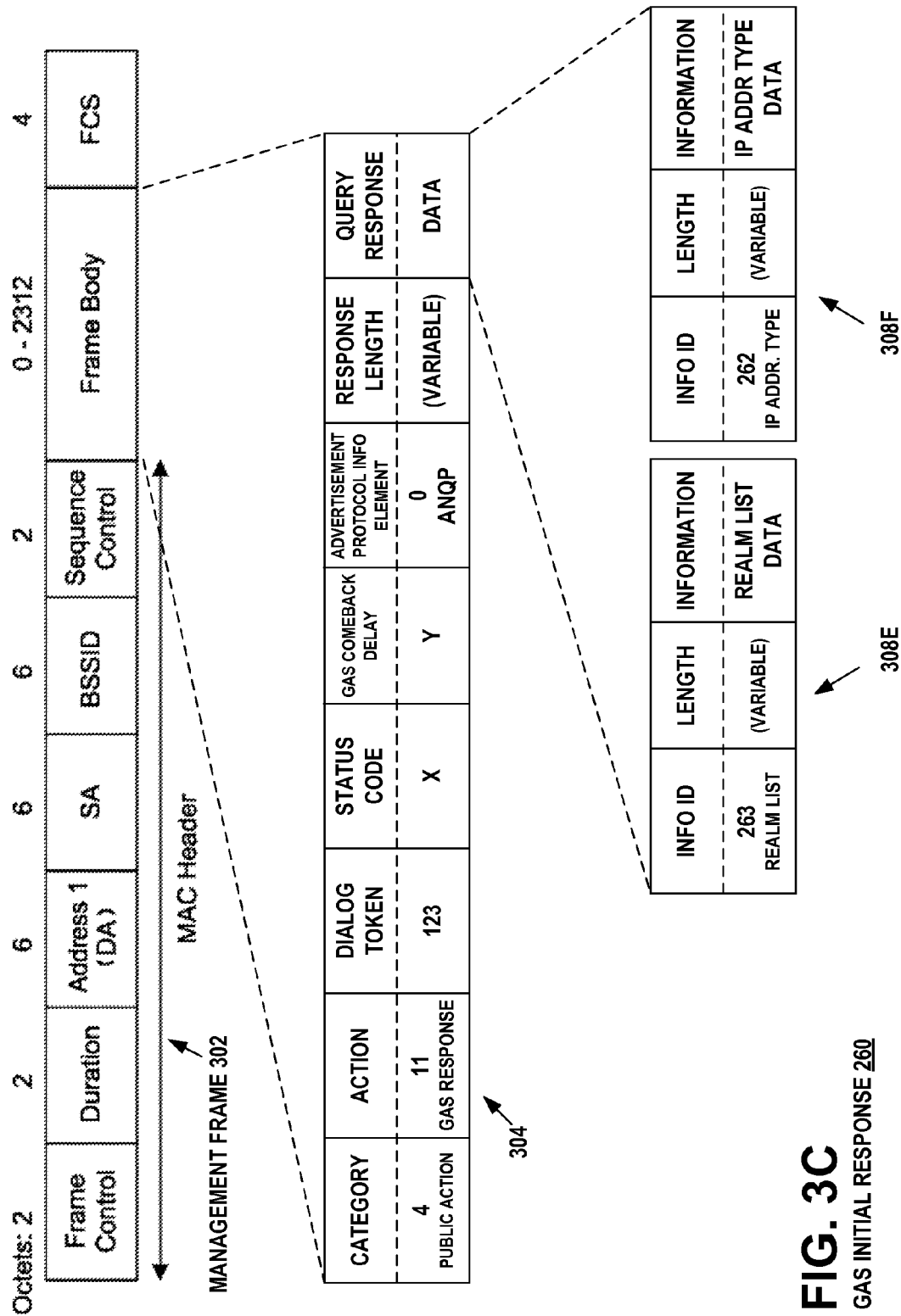
FIG. 3C illustrates an example frame body format of the Generic Advertisement Service (GAS) Initial Response Frame, in accordance with an example embodiment of the invention.
Figure 8:
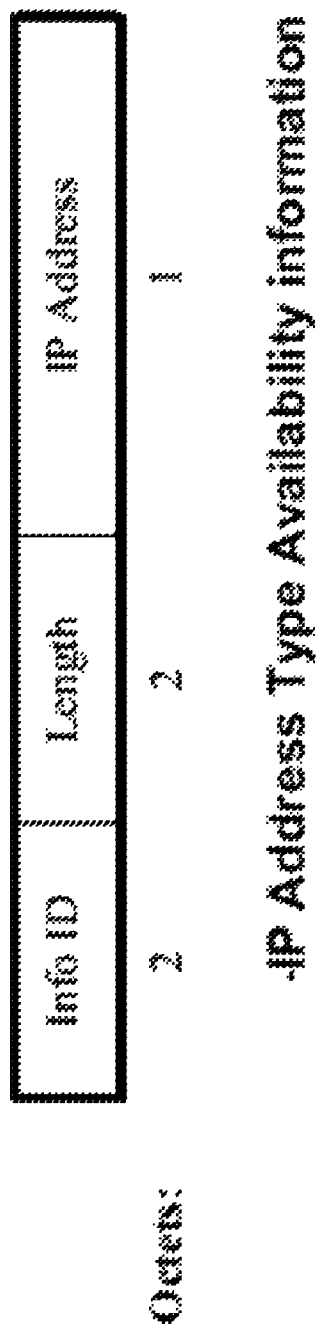
FIG. 8 illustrates an example IP Address Type Availability Information, in accordance with an example embodiment of the invention.

FIG. 3C illustrates an example frame body format of the Generic Advertisement Service (GAS) Initial Response Frame 260 in the MAC management frame 302. The public action field 304 value is set to value of 11 to indicate a GAS initial response 260. As shown in FIG. 3C, when the public action field 304 is set to value of 11 to indicate GAS initial response 260, several ANQP information elements 308 may be sent in the query response field. The ANQP elements 308E and 308F respectively contain the query response data "263" for the realm list data and "262" for the IP address type data, that is sent from the access point AP 160 to the mobile wireless device STA 102. The information field of the ANQP elements 308E and 308F contain the requested data sent from the access point AP 160, which may be in one or multiple ANQP info elements 308. An example format for the specified data of the NAI Realm List in ANQP element 308E, is shown in FIG. 7A. An example format for the specified data of the IP Address Type Availability Information in ANQP element 308F, is shown in FIG. 8.

FIG. 3D illustrates an example of ANQP Information ID Definitions for the ANQP info elements 308. In accordance with an embodiment of the invention, a new ANQP information ID definition is provided to define the response condition of the GAS initial request 250 sent from the mobile wireless device STA 102, and it is indicated by a new information ID number, for example "272". An example ANQP element 308A having an Info ID=272 indicating that it defines a response condition, is shown in FIG. 3B for the GAS initial request frame 250. The example ANQP element 308A may, itself, contain additional information listing the specified characteristics that are required, or alternately it may be accompanied by other ANQP elements 308B and 308C, for example, that list the specified characteristics that are required.

For example, a value of "0" in the information field of the ANQP element 308A in FIG. 3B, indicates that all of the specified characteristics must be met by the access point. The accompanying ANQP elements 308B and 308C respectively contain the query request "263"="realm list" and "262"="IP address type" as the specified characteristics that are required from the access point AP 160. Alternately, if the information field of the ANQP element 308A in FIG. 3B has a value of "1", that indicates that any of the characteristics may be met that are specified in accompanying ANQP elements 308B and 308C. Other values may be used in the information field of the ANQP element 308A in FIG. 3B, to indicate that a specified subset of all of the specified characteristics must be met, which is less than all of the specified characteristics. The response condition required from the access point is that the access point must have the specified characteristics, either all of them, any of them, or a subset of all of them, before it is allowed to respond.

Some example ANQP Information ID Definitions for the various types of information are shown in FIG. 3D, such as ID=262 for the IP Address Type Availability Information and ID=263 for the NAI Realm List. Example ANQP Information ID Definitions in the Info ID field of the ANQP elements 308 indicating specified characteristics that are required of the access point may include the following:

[1] a roaming agreement with the home realm;
[2] credentials of the home realm;
[3] a domain name of the home realm;
[4] a preference for IP address type;
[5] an access point that has its location configured;
[6] an access point that supports unauthenticated emergency calls; and
[7] an access point that supports a specified IP domain service.

Figure 2B:
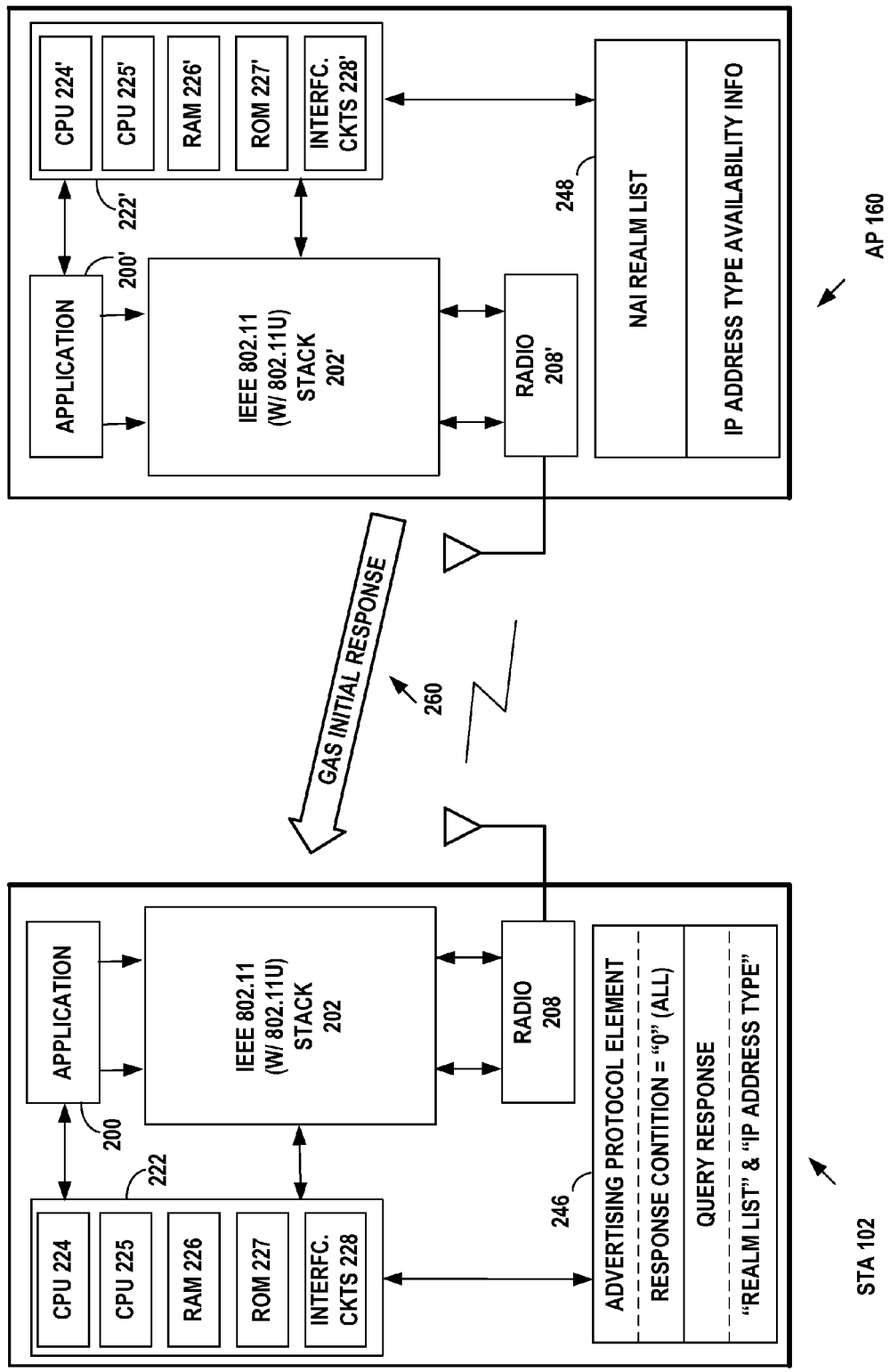
FIG. 2B illustrates the example wireless network and functional block diagram of FIG. 2A, of the mobile wireless device and the third access point in the second realm, with the third access point transmitting a generic advertisement service (GAS) initial response frame, in accordance with an example embodiment of the invention.

FIG. 2B illustrates the example wireless network and functional block diagram of FIG. 2A, of the mobile wireless device STA 102 and the third access point AP 160 in the second realm A, with the third access point AP 160 transmitting a generic advertisement service (GAS) initial response frame 260, in accordance with an example embodiment of the invention.

The Generic Advertisement Service (GAS) initial response frame 260 is used for interworking procedure in wireless local access network. The GAS initial response frame 260 shown in FIG. 3C, includes a category field that is set to a value of 4 indicating a public action frame. The GAS initial response frame 260 shown in FIG. 3C, includes an action field 304 that is set to a value of 11 indicating a GAS initial response action. The GAS initial response frame 260 shown in FIG. 3C, includes a dialog token field which is set to a value, such as "123", identical to the corresponding value in the GAS initial request frame, to enable relating the response frame to the request frame. The GAS initial response frame 260 shown in FIG. 3C, includes a comeback delay value field.

In accordance with embodiments of the invention, the GAS initial response frame 260 shown in FIG. 3C, includes an advertisement protocol information element field indicating format of the ANQP elements 308. In embodiments of the invention, an ANQP element 308 may be included (not shown) in the response from the access point 160, listing the particular characteristics that have been satisfied, by listing the corresponding Information ID Definitions shown in FIG. 3D. The response condition satisfied by the access point AP 160 may be designated as either all of characteristics, any of them, or a subset of all of them. The response condition required of the access point 160 has been successfully satisfied, since the access point 160 is responding with the GAS initial response frame 260.

The GAS initial response frame 260 shown in FIG. 3C, includes the query response field containing one or more ANQP information elements 308 containing the specified data, as listed in FIG. 3D, which the receiving access point AP 160 has satisfied in order for it to be allowed to reply with a response. An example format for the specified data of the NAI Realm List, in a response ANQP information element 308, is shown in FIG. 7A. An example format for the specified data in the Roaming Consortium List, in a response ANQP information element 308, is shown in FIGS. 7B and 7C. An example format for the specified data in the Domain Name List, in a response ANQP information element 308, is shown in FIG. 7D. An example format for the specified data in the Domain Name Field, in a response ANQP information element 308, is shown in FIG. 7E. An example format for the specified data in the IP Address Type Availability Information, in a response ANQP information element 308, is shown in FIG. 8.

Example ANQP Information ID Definitions in the Info ID field of the ANQP elements 308 that contain the requested data for the specified characteristics of the access point AP 160, may include the following:

[1] a roaming agreement with the home realm;
[2] credentials of the home realm;
[3] a domain name of the home realm;
[4] a preference for IP address type;
[5] an access point that has its location configured;
[6] an access point that supports unauthenticated emergency calls; and
[7] an access point that supports a specified IP domain service.

The mobile wireless device STA 102 and the third access point AP 160 are shown in FIGS. 2A and 2B in functional block diagram form to illustrate an example embodiment of their components. The wireless access point AP 160 includes a processor 222', which includes a single core CPU or multiple core central processing unit (CPU) 224' and 225', a random access memory (RAM) 226', a read only memory (ROM) 227', and interface circuits 228' to interface with one or more radio transceivers 208', battery or house power sources, keyboard, display, etc. The RAM and ROM can be removable memory devices such as smart cards, SIMs, WIMs, semiconductor memories such as RAM, ROM, PROMS, flash memory devices, etc.

The mobile wireless device STA 102 includes a processor 222, which includes a dual core central processing unit 224 and 225, a random access memory (RAM) 226, a read only memory (ROM) 227, and interface circuits 228 to interface with one or more radio transceivers 208, battery and other power sources, key pad, touch screen, display, microphone, speakers, ear pieces, camera or other imaging devices, etc. in the mobile wireless device STA 102. The RAM and ROM can be removable memory devices such as smart cards, SIMs, WIMs, semiconductor memories such as RAM, ROM, PROMS, flash memory devices, etc.

An example embodiment of the IEEE 802.11 protocol stack includes the IEEE 802.11u protocol 202 in the mobile wireless device STA 102. An example embodiment of the IEEE 802.11 protocol stack includes the IEEE 802.11u protocol 202' in the access point device AP 160. The protocol stacks 202 and 202' may be computer code instructions stored in the RAM and/or ROM memory of the respective processors 222 and 222', which when executed by the central processing units (CPU), carry out the functions of the example embodiments of the invention.

In an example embodiment of the mobile wireless device STA 102, a buffer 246 contains the advertising protocol element field and the query response field. The advertising protocol element field has a response condition="0", requiring that all required characteristics listed in the query response field, "REALM LIST" and "IP ADDRESS TYPE", must be returned in a GAS initial response 260 by any access point receiving the GAS initial request 250.

In an example embodiment of the wireless access point AP 160, a buffer 248 contains required characteristics, including the "NAI Realm List" and the "IP Address Type Availability Information". If these required characteristics match the requirements in the advertising protocol element field and the query response field of the received GAS initial request 250, then the AP 160 transmits the GAS initial response 260 with the required characteristics.

FIG. 4A illustrates the example of the mobile wireless device STA 102 and the third access point AP 160 of FIGS. 2A and 2B, with the mobile wireless device STA 102 multicasting a generic advertisement service (GAS) initial request frame 250 containing a response condition requiring that all specified characteristics must be present at a receiving access point before a response may be made. The third access point AP 160 is shown transmitting a generic advertisement service (GAS) initial response frame 260 containing all of the specified characteristics, in accordance with an example embodiment of the invention.

FIG. 4B illustrates the example of the mobile wireless device STA 102 and the third access point AP 160 of FIGS. 2A and 2B, with the mobile wireless device STA 102 multicasting a generic advertisement service (GAS) initial request frame 250 containing a response condition requiring that all specified characteristics must be present at a receiving access point before a response may be made. The third access point AP 160 is shown not transmitting any response, since the access point AP 160 does not have all of the specified characteristics, in accordance with an example embodiment of the invention.

Figure 4C:
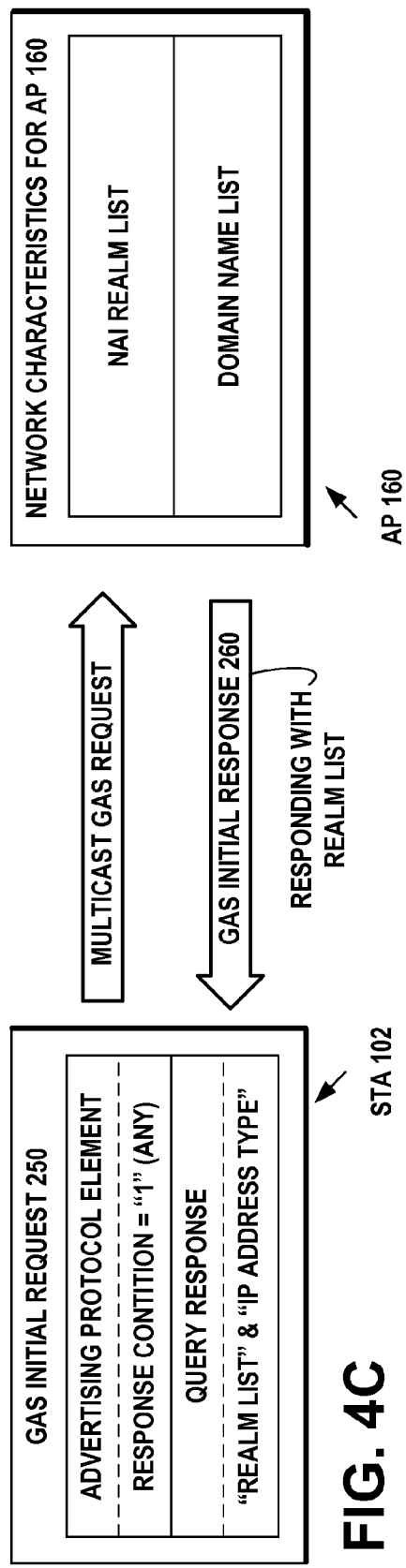
FIG. 4C illustrates an example of the mobile wireless device and the third access point of FIGS. 2A and 2B, with the mobile wireless device multicasting a generic advertisement service (GAS) initial request frame containing a response condition requiring that if there are any of the specified characteristics present at the access point, then a response may be made, and the third access point is shown transmitting a generic advertisement service (GAS) initial response frame containing one of the specified characteristics, in accordance with an example embodiment of the invention.

FIG. 4C illustrates the example of the mobile wireless device STA 102 and the third access point AP 160 of FIGS. 2A and 2B, with the mobile wireless device STA 102 multicasting a generic advertisement service (GAS) initial request frame 250 containing a response condition requiring that if there are any of the specified characteristics present at a receiving access point, then a response may be made. The third access point AP 160 is shown transmitting a generic advertisement service (GAS) initial response frame 260 containing one of the specified characteristics, in accordance with an example embodiment of the invention.

FIG. 5A illustrates an example embodiment of a flow diagram 500 for the process in the mobile wireless device STA 102. FIG. 5A is an example of steps in the procedure carried out by the device in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

Step 502: transmitting a wireless generic advertisement service request to a multicast address of a multicast group of wireless devices or to a broadcast address, specifying one or more required characteristics; and Step 504: receiving one or more wireless generic advertisement service responses from only one or more of the plurality of wireless devices having the specified characteristics.

FIG. 5B illustrates an example embodiment of a flow diagram 550 for the process in the access point device AP 160. FIG. 5B is an example of steps in the procedure carried out by the device in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

Step 552: receiving a wireless generic advertisement service request to a multicast address of a multicast group of wireless devices or to a broadcast address, specifying one or more required characteristics; and Step 554: transmitting a wireless generic advertisement service response only if the specified characteristics are available.

FIG. 5C illustrates an example embodiment of a flow diagram 560 for the process in the mobile wireless device STA 102. FIG. 5C is an example of steps in the procedure carried out by the device in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

Step 562: groupcasting or broadcasting a wireless request to a plurality of wireless devices, specifying one or more required characteristics, the request including at least one of an indication that any of the one or more characteristics is required, an indication that a subset of the one or more characteristics is required, or an indication that all of the one or more characteristics are required; and Step 564: receiving one or more wireless responses from only one or more of the plurality of wireless devices having the specified characteristics.

FIG. 5D illustrates an example embodiment of a flow diagram 580 for the process in the access point device AP 160. FIG. 5D is an example of steps in the procedure carried out by the device in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

Step 582: receiving a groupcast or broadcast wireless request specifying one or more required characteristics, the request including at least one of an indication that any of the one or more characteristics is required, an indication that a subset of the one or more characteristics is required, or an indication that all of the one or more characteristics are required; and Step 584: transmitting a wireless response only if the specified characteristics are available.

FIG. 6 illustrates example Advertisement Protocol ID Definitions. The Advertisement Protocol ID is a variable length field. An advertisement protocol ID of "0", is defined in FIG. 6 as the access network query protocol (ANQP) format for the ANQP element 308. ANQP is a protocol used by a requesting STA to query another STA. The receiving STA can respond to queries with or without proxying the query to a server in an external network.

The specified data in the NAI Realm List of FIG. 7A, is carried in a response ANQP information element 308E. The GAS initial response frame 260 shown in FIG. 3C, includes the query response field containing one or more ANQP information elements 308 containing the specified data, as listed in FIG. 3D, which the receiving access point AP 160 has satisfied in order for it to be allowed to reply with a response. FIG. 7A illustrates an example NAI Realm List Format, in a response ANQP information element 308E. The NAI Realm list provides a list of network access identifier (NAI) realms corresponding to Subscription Service Providers (SSP) or other entities whose networks or services are accessible via this access point (AP). Optionally included for each NAI realm is a list of one or more Extensible Authentication Protocol (EAP) Method subfields, which that NAI realm uses for authentication. The NAI Realm list may be returned in response to a GAS Query.

The specified data in the Roaming Consortium List of FIG. 7B, is carried in a response ANQP information element 308E. The GAS initial response frame 260 shown in FIG. 3C, includes the query response field containing one or more ANQP information elements 308 containing the specified data, as listed in FIG. 3D, which the receiving access point AP 160 has satisfied in order for it to be allowed to reply with a response. FIG. 7B illustrates an example Roaming Consortium List Format. FIG. 7C illustrates an example OI Duple Format. The Roaming Consortium list provides a list of information about the Roaming Consortium and/or Subscription Service Providers (SSP) whose networks are accessible via this AP. This list may be returned in response to a GAS Query. There are zero or more OI Duples in this list. OIs contained within the Roaming Consortium element are also included in this list. Each OI identifies a roaming consortium (group of SSPs with inter-SSP roaming agreement) or a single SSP.

The specified data in the Domain Name List of FIG. 7D, is carried in a response ANQP information element 308E. The GAS initial response frame 260 shown in FIG. 3C, includes the query response field containing one or more ANQP information elements 308 containing the specified data, as listed in FIG. 3D, which the receiving access point AP 160 has satisfied in order for it to be allowed to reply with a response. FIG. 7D illustrates an example Domain Name List Format. FIG. 7E illustrates an example Domain Name Field Format. The specified data in the Domain Name Field is contained in a Domain Name List. The Domain Name list element provides a list of one or more domain names of the entity operating the IEEE 802.11 access network. Domain Names in this element are taken from a Domain Name Table. This list element may be returned in response to a GAS Query.

The specified data in the IP Address Type Availability Information of FIG. 8, is carried in a response ANQP information element 308F. The GAS initial response frame 260 shown in FIG. 3C, includes the query response field containing one or more ANQP information elements 308 containing the specified data, as listed in FIG. 3D, which the receiving access point AP 160 has satisfied in order for it to be allowed to reply with a response. FIG. 8 illustrates an example IP Address Type Availability Information. The IP Address Type Availability information provides STA with the information about the availability of IP address version and type that could be allocated to the STA after successful association. This information may be returned in response to a GAS Query.

The features described herein may be employed in networks other than Wireless LAN networks. An example of a wireless short-range communication technology is Bluetooth™ communication protocol, which operates in the 2.4 GHz ISM band. Bluetooth™ Technical Specifications are published by the Bluetooth™ SIG, Inc. in the *Bluetooth™ Core Specification*, Version 4.0, Jun. 30, 2010 (incorporated herein by reference), which includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

In accordance with example embodiments of the invention, a Bluetooth™ device may perform groupcasting or broadcasting of a wireless request to a plurality of other Bluetooth™ devices, specifying one or more required characteristics, the request including at least one of an indication that any of the one or more characteristics is required, an indication that a subset of the one or more characteristics is required, or an indication that all of the one or more characteristics are required. The requesting Bluetooth™ may receive one or more wireless responses from only one or more of the plurality of Bluetooth™ devices having the specified characteristics.

The HIPERLAN standard provides a wireless LAN with a high data rate of up to 54 Mbps and a medium-range of 50 meters. There are two HIPERLAN standards. HIPERLAN Type 1 is a dynamic, priority driven channel access protocol similar to wireless Ethernet. HIPERLAN Type 2 is reserved channel access protocol similar to a wireless version of ATM. HIPERLAN Type 1 ad hoc networks support distributed activities similar those of the Bluetooth piconets and IEEE 802.11 independent basic service sets (IBSS). The HIPERLAN Type 1 standard provides wireless devices with service inquiry features similar to those of the Bluetooth inquiry and scanning features and the IEEE 802.11 probe request and response features. An overview of the HIPERLAN Type 1 principles of operation is provided in the publication HIPERLAN Type 1 Standard, ETSI ETS 300 652, WA2 December 1997.

In accordance with example embodiments of the invention, a HIPERLAN Type 1 device may perform groupcasting or broadcasting of a wireless request to a plurality of other HIPERLAN Type 1 devices, specifying one or more required characteristics, the request including at least one of an indication that any of the one or more characteristics is required, an indication that a subset of the one or more characteristics is required, or an indication that all of the one or more characteristics are required. The requesting HIPERLAN Type 1 may receive one or more wireless responses from only one or more of the plurality of HIPERLAN Type 1 devices having the specified characteristics.

HIPERLAN Type 2 is a reserved channel access protocol that forms ad hoc networks. HIPERLAN Type 2 ad hoc networks support distributed activities similar those of the HIPERLAN Type 1 ad hoc networks, Bluetooth piconets and IEEE 802.11 independent basic service sets (IBSS). Centralized mode is used to operate HIPERLAN Type 2 as an access network via a fixed access point. In addition a capability for direct link communication is provided. This mode is used to operate HIPERLAN Type 2 as an ad hoc network without relying on a cellular network infrastructure. Restricted user mobility is supported within the local service area. Wide area roaming mobility can also be supported. An overview of the HIPERLAN Type 2 principles of operation is provided in the Broadband Radio Access Networks (BRAN), HIPERLAN Type 2, System Overview, ETSI TR 101 683 VI.I.1 (2000-02) and a more detailed specification of its ad hoc network architecture is described in HIPERLAN Type 2, Data Link Control (DLC) Layer; Part 4. Extension for Home Environment, ETSI TS 101 761-4 V1.2.1 (2000-12).

In accordance with example embodiments of the invention, a HIPERLAN Type 2 device may perform groupcasting or broadcasting of a wireless request to a plurality of other HIPERLAN Type 2 devices, specifying one or more required characteristics, the request including at least one of an indication that any of the one or more characteristics is required, an indication that a subset of the one or more characteristics is required, or an indication that all of the one or more characteristics are required. The requesting HIPERLAN Type 2 may receive one or more wireless responses from only one or more of the plurality of HIPERLAN Type 2 devices having the specified characteristics.

In addition to Bluetooth™ and Hiperlan, the features described herein may be employed in other popular short-range communication technologies, such as Wireless USB (WUSB), Ultra Wide-band (UWB), ZigBee (IEEE 802.15.4, IEEE 802.15.4a), and ultra high frequency radio frequency identification (UHF RFID) technologies.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable, non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in networks other than Wireless LAN networks.

What is claimed is:

1. A method, comprising:
transmitting a wireless generic advertisement service request to a multicast address of a multicast group of wireless devices, specifying one or more required characteristics; and
receiving one or more wireless generic advertisement service responses from only one or more of the plurality of wireless devices having the specified characteristics.

2. The method of claim 1, wherein some of the plurality of wireless devices are access points belonging to a realm specified in the request.

3. The method of claim 1, wherein some of the plurality of wireless devices are access points belonging to a realm having a roaming agreement with a home realm.

4. The method of claim 1, wherein the one or more required characteristics specified by the request is at least one of being an access point belonging to a realm specified in the request or being an access point belonging to a realm having a roaming agreement with a home realm.

5. An apparatus, comprising:
at least one processor;
at least one memory including computer program code;
the at least one memory and the computer program code configured to, with the at least one processor, cause the device at least to:
generate a generic advertisement service request to be wirelessly transmitted to a multicast address of a multicast group of wireless devices, specifying one or more required characteristics; and
receive one or more wireless generic advertisement service responses from only one or more of the plurality of wireless devices having the specified characteristics.

6. The apparatus of claim 5, wherein some of the plurality of wireless devices are access points belonging to a realm specified in the request.

7. The apparatus of claim 5, wherein some of the plurality of wireless devices are access points belonging to a realm having a roaming agreement with a home realm.

8. The apparatus of claim 5, wherein the one or more required characteristics specified by the request is at least one of being an access point belonging to a realm specified in the request or being an access point belonging to a realm having a roaming agreement with a home realm.

9. A computer program product comprising computer executable program code recorded on a computer readable, non-transitory storage medium, the computer executable program code, when executed by a computer processor, comprising:
code for transmitting a wireless generic advertisement service request to a multicast address of a multicast group of wireless devices, specifying one or more required characteristics; and
code for receiving one or more wireless generic advertisement service responses from only one or more of the plurality of wireless devices having the specified characteristics.

10. A method, comprising:
receiving a wireless generic advertisement service request to a multicast address of a multicast group of wireless devices, specifying one or more required characteristics; and
transmitting a wireless generic advertisement service response only if the specified characteristics are available.

11. An apparatus, comprising:
at least one processor;
at least one memory including computer program code;
the at least one memory and the computer program code configured to, with the at least one processor, cause the device at least to:
receive a wireless generic advertisement service request to a multicast address of a multicast group of wireless devices, specifying one or more required characteristics; and
generate a generic advertisement service response to be wirelessly transmitted only if the specified characteristics are available.

12. A method, comprising:
groupcasting a wireless generic advertisement service request to a plurality of wireless devices, specifying one or more required characteristics, the generic advertisement service request including at least one of an indication that any of the one or more characteristics is required, an indication that a subset of the one or more characteristics is required, or an indication that all of the one or more characteristics are required; and
receiving one or more wireless generic advertisement service responses from only one or more of the plurality of wireless devices having the specified characteristics.

13. The method of claim 12, wherein the generic advertisement service request specifies that in order to respond to the request, one or more of the plurality of wireless devices must belong to a realm specified in the request or that in order to respond to the request, one or more of the plurality of wireless devices must belong to a realm that has a roaming relationship with a realm specified in the request.

14. The method of claim 12, wherein the wireless request is a generic advertisement service initial request frame and the one or more wireless responses is a generic advertisement service initial response frame.

15. The method of claim 12, wherein some of the plurality of wireless devices are access points belonging to a realm having a roaming agreement with a home realm.

16. An apparatus, comprising:
at least one processor;
at least one memory including computer program code;
the at least one memory and the computer program code configured to, with the at least one processor, cause the device at least to:

generate a generic advertisement service request to be wirelessly groupcast to a plurality of wireless devices, specifying one or more required characteristics, the generic advertisement service request including at least one of an indication that any of the one or more characteristics is required, an indication that a subset of the one or more characteristics is required, or an indication that all of the one or more characteristics are required; and receive one or more wireless generic advertisement service responses from only one or more of the plurality of wireless devices having the specified characteristics.

17. The apparatus of claim 16, wherein the generic advertisement service request specifies that in order to respond to the request, one or more of the plurality of wireless devices must belong to a realm specified in the request or that in order to respond to the request, one or more of the plurality of wireless devices must belong to a realm that has a roaming relationship with a realm specified in the request.

18. The apparatus of claim 16, wherein the wireless request is a generic advertisement service initial request frame and the one or more wireless responses is a generic advertisement service initial response frame.

19. The apparatus of claim 16, wherein some of the plurality of wireless devices are access points belonging to a realm having a roaming agreement with a home realm.

20. A computer program product comprising computer executable program code recorded on a computer readable, non-transitory storage medium, the computer executable program code, when executed by a computer processor, comprising:

code for groupcasting a wireless generic advertisement service request to a plurality of wireless devices, specifying one or more required characteristics, the generic advertisement service request including at least one of an indication that any of the one or more characteristics is required, an indication that a subset of the one or more characteristics is required, or an indication that all of the one or more characteristics are required; and code for receiving one or more wireless generic advertisement service responses from only one or more of the plurality of wireless devices having the specified characteristics.

21. A method, comprising:

receiving a groupcast wireless generic advertisement service request specifying one or more required characteristics, the generic advertisement service request including at least one of an indication that any of the one or more characteristics is required, an indication that a subset of the one or more characteristics is required, or an indication that all of the one or more characteristics are required; and transmitting a wireless generic advertisement service response only if the specified characteristics are available.

22. An apparatus, comprising:

at least one processor;

at least one memory including computer program code;

the at least one memory and the computer program code configured to, with the at least one processor, cause the device at least to:

receive a groupcast wireless generic advertisement service request specifying one or more required characteristics, the generic advertisement service request including at least one of an indication that any of the one or more characteristics is required, an indication that a subset of the one or more characteristics is required, or an indication that all of the one or more characteristics are required; and generate a generic advertisement service response to be wirelessly transmitted only if the specified characteristics are available.

* * * * *